US012678795B2

(12) United States Patent
Barnard et al.

(10) Patent No.: US 12,678,795 B2
(45) Date of Patent: Jul. 14, 2026

(54) CARTRIDGES AND RELATED SYSTEMS AND METHODS

(71) Applicant: ILLUMINA, INC., San Diego, CA (US)

(72) Inventors: Steven Barnard, Del Mar, CA (US); Craig Ciesla, Mountain View, CA (US); Paul Crivelli, San Diego, CA (US); Justin Davidson, Solana Beach, CA (US); Darren Segale, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 678 days.

(21) Appl. No.: 18/002,427

(22) PCT Filed: Aug. 31, 2021

(86) PCT No.: PCT/US2021/048359
§ 371 (c)(1),
(2) Date: Dec. 19, 2022

(87) PCT Pub. No.: WO2022/051249
PCT Pub. Date: Mar. 10, 2022

(65) Prior Publication Data

US 2023/0226553 A1 Jul. 20, 2023

Related U.S. Application Data

(60) Provisional application No. 63/074,289, filed on Sep. 3, 2020.

(51) Int. Cl.
*G01N 37/00* (2006.01)
*B01L 9/06* (2006.01)

(52) U.S. Cl.
CPC ........... *B01L 9/06* (2013.01); *B01L 2200/025* (2013.01); *B01L 2200/04* (2013.01); *B01L 2200/143* (2013.01); *B01L 2300/021* (2013.01)

(58) Field of Classification Search
None
See application file for complete search history.

(56) References Cited

U.S. PATENT DOCUMENTS 9,718,058 B2 8/2017 Khattak et al.
10,184,946 B2 1/2019 Gumbrecht et al.
10,416,054 B2 9/2019 Boehm et al.
(Continued)

*Primary Examiner* — Paul S Hyun
(74) *Attorney, Agent, or Firm* — MARSHALL, GERSTEIN & BORUN LLP

(57) ABSTRACT

Cartridges and related systems and methods are disclosed. In accordance with an implementation, a method includes securing a sample container in a sample container receptacle of a cartridge using a sample container lock and coupling the cartridge to a cartridge receptacle of a system. The method also includes depositing a sample from the sample container within a sample well of the cartridge and determining a presence of a target molecule within the sample using the system. In response to the target molecule being present within the sample, the method includes releasing the sample container lock of the cartridge to allow the sample container to be removed from the sample container receptacle and for the cartridge to remain coupled to the system.

8 Claims, 11 Drawing Sheets

(56) References Cited

U.S. PATENT DOCUMENTS

| | | | | |
|---|---|---|---|---|
| 2004/0163970 | A1* | 8/2004 | Sin | G01N 33/4915<br>205/792 |
| 2006/0000296 | A1 | 1/2006 | Salter | |
| 2008/0206852 | A1 | 8/2008 | Numajiri | |
| 2015/0132860 | A1* | 5/2015 | Cook | B01L 3/502715<br>436/501 |
| 2016/0091509 | A1 | 3/2016 | Di Tullio et al. | |
| 2016/0129437 | A1* | 5/2016 | Kayyem | B01L 7/525<br>204/600 |
| 2017/0043335 | A1 | 2/2017 | Khattak et al. | |
| 2017/0227510 | A1 | 8/2017 | Siciliano et al. | |
| 2019/0201899 | A1 | 7/2019 | Cereda et al. | |
| 2019/0265259 | A1 | 8/2019 | Schulz et al. | |
| 2020/0391210 | A1* | 12/2020 | Handique | B01L 3/502715 |

* cited by examiner

CARTRIDGES AND RELATED SYSTEMS AND METHODS

RELATED APPLICATION

This application is a National Stage Application of PCT/US2021/048359, filed Aug. 31, 2021, which claims priority to U.S. Provisional Patent Application No. 63/074,289, filed Sep. 3, 2020, the contents of which are incorporated by reference herein in their entireties and for all purposes.

BACKGROUND

Substrates may be imaged by an imaging system to detect the presence of a particular target of interest. The target of interest may be associated with a virus or a bacterial infection.

SUMMARY

Shortcomings of the prior art can be overcome and benefits as described later in this disclosure can be achieved through the provision of cartridges, such as one for determining a presence of a target molecule, and related systems and methods described herein. Various implementations of the apparatus and methods are described below, and the apparatus and methods, including and excluding the additional implementations enumerated below, in any combination (provided these combinations are not inconsistent), may overcome these shortcomings and achieve the benefits described herein.

At least one aspect of this disclosure is directed toward cartridges, sample containers, and related systems used in point-of-care diagnostics. A wide spectrum of tests may be performed using the disclosed examples including tests for severe acute respiratory syndrome coronavirus 2 [COVID-19], respiratory syncytial virus (RSV), strep throat, and/or influenza. In implementations in which tests performed are for Covid-19, these tests may be routinely performed (e.g., daily) to determine the presence/absence of the virus.

In some implementations, a testing kit may be provided that includes the cartridge, the sample container, a swab used to perform a sampling procedure, and a pipet used to transfer a sample from the sample container to a sample well of the cartridge. The sampling procedure may include a nasal swab, a nasopharyngeal swab, or a throat swab.

The cartridge may include a sample well, a sample container receptacle, and a lock movable from a locked position to an unlocked position. The sample container is disposable within the sample container receptacle and securable therein using the lock. Alternatively, the cartridge may not include the lock.

The system may include a cartridge receptacle, an imaging system used to obtain image data of a sample, and a processor that processes the image data to determine a presence of a target molecule (e.g., Covid-19) within the sample. The system can also include a lock release used to release the lock (move it to the unlocked position) upon a determination that the target molecule is present within the sample. Advantageously, releasing the lock when the target molecule is identified allows the sample container to be removed from the sample container receptacle and placed in, for example, a rack for subsequent testing to verify the initial test results. However, the lock release of the system may not release the lock when the target molecule is not identified, allowing both the cartridge and the sample container to be removed from the system and disposed of together. By releasing the sample container from the cartridge when a target molecule is present but not when the target molecule is not present, samples that do not have the target molecule are not inadvertently saved for subsequent testing.

In accordance with a first implementation, a method includes securing a sample container in a sample container receptacle of a cartridge using a sample container lock and coupling the cartridge to a cartridge receptacle of a system. The method also includes depositing a sample from the sample container within a sample well of the cartridge and determining a presence of a target molecule within the sample using the system. In response to the target molecule being present within the sample, the method includes releasing the sample container lock of the cartridge to allow the sample container to be removed from the sample container receptacle and for the cartridge to remain coupled to the system.

In accordance with a second implementation, an apparatus includes a cartridge and a sample container. The cartridge includes a sample chamber and a sample container receptacle. The sample container is disposable within the sample container receptacle. The sample container receives a sample and a sample portion of the sample is receivable within the sample chamber for testing to determine a presence of a target molecule.

In accordance with a third implementation, an apparatus includes a system, a cartridge, and a sample container. The system has a cartridge receptacle and a lock release. The cartridge is couplable with the cartridge receptacle and includes a sample well, a sample container receptacle, and a sample container lock movable, using the lock release, between a locked position and an unlocked position. The sample container is disposable within the sample container receptacle and is securable therein using the sample container lock. A sample is receivable within the sample container and a sample portion of the sample is receivable within the sample chamber. A test is performable by the system on the sample portion to determine a presence of a target molecule. The lock release is actuatable to actuate the sample container lock from the locked position to the unlocked position in response to the target molecule being present within the sample to allow the sample container to be removed from the sample container receptacle. The lock release does not actuate the sample container lock from the locked position to the unlocked position in response to the target molecule not being present within the sample.

In accordance with a fourth implementation, a method includes securing a sample container in a sample container receptacle of a cartridge using a sample container lock and coupling the cartridge to a cartridge receptacle of a system. The method also includes depositing a sample from the sample container within a sample well of the cartridge and determining a presence of a target molecule within the sample using the system. In response to the target molecule being present within the sample, the method includes releasing the sample container lock of the cartridge to allow the sample container to be removed from the sample container receptacle.

In accordance with a fifth implementation, an apparatus includes a cartridge including a sample chamber and a sample container. The sample container receives a sample and wherein a sample portion of the sample is receivable within the sample chamber for testing to determine a presence of a target molecule.

In further accordance with the foregoing first, second, third, and/or fourth implementations, an apparatus and/or method may further include any one or more of the following:

In accordance with an implementation, the target molecule is associated with severe acute respiratory syndrome coronavirus 2.

In accordance with another implementation, releasing the sample container lock of the cartridge includes actuating the sample container lock using a lock release of the system.

In accordance with another implementation, in response to the target molecule not being present within the sample, the method includes uncoupling the cartridge and the cartridge receptacle to allow the cartridge and the sample container secured thereto to be removed from the system.

In accordance with another implementation, the sample container lock includes a spring-biased pawl and the sample container includes a flange and securing the sample container in the sample container receptacle includes positioning the spring-biased pawl over top of the flange.

In accordance with another implementation, the method includes reading, using the system, a code on at least one of the cartridge or the sample container.

In accordance with another implementation, reading the code includes reading the code on the sample container through a window of the cartridge.

In accordance with another implementation, the method includes illuminating the sample container using the system in response to at least one of: 1) the target molecule being present within the sample; or 2) the target molecule not being present within the sample.

In accordance with another implementation, securing the sample container in the sample container receptacle includes positioning the sample container through a collar of the cartridge.

In accordance with another implementation, the method includes exposing the sample to a reagent.

In accordance with another implementation, exposing the sample to the reagent includes flowing a reagent from a reagent reservoir of the cartridge through a fluidic line of the cartridge toward the sample well.

In accordance with another implementation, the cartridge includes a sample container lock to move between a locked position and an unlocked position and the sample container to be secured within the sample container receptacle using the sample container lock.

In accordance with another implementation, the sample container lock remains in the locked position in response to the target molecule not being present within the sample and is movable to the unlocked position in response to the target molecule being present within the sample to allow the sample container to be removed from the sample container receptacle.

In accordance with another implementation, the sample container lock includes a latch to pivot between the locked position and the unlocked position.

In accordance with another implementation, the sample container includes a flange to be engaged by the latch to secure the sample container within the sample container receptacle.

In accordance with another implementation, the sample container includes a groove that receives the latch to secure the sample container within the sample container receptacle.

In accordance with another implementation, the sample container receptacle includes a boss defining a hole to receive the sample container.

In accordance with another implementation, the cartridge includes a visual display to indicate the presence or an absence of the target molecule within the sample portion.

In accordance with another implementation, the sample container carries a code and the cartridge includes a hole to receive the sample container and a window to allow the code to be viewable.

In accordance with another implementation, the sample container lock includes a cantilever biased toward the sample container receptacle and to engage the sample container to secure the sample container within the sample container receptacle.

In accordance with another implementation, the sample container receptacle includes an annulus.

In accordance with another implementation, the system includes a light assembly displaying a first color through the sample container indicative of the target molecule being present within the sample and displaying a second color through the sample container indicative of the target molecule not being present within the sample.

It should be appreciated that all combinations of the foregoing concepts and additional concepts discussed in greater detail below (provided such concepts are not mutually inconsistent) are contemplated as being part of the inventive subject matter disclosed herein and may be implemented in any combination to achieve the benefits described herein. In particular, all combinations of claimed subject matter appearing at the end of this disclosure are contemplated as being part of the inventive subject matter disclosed herein and may be implemented in any combination to achieve the benefits described herein.

DETAILED DESCRIPTION

Although the following text discloses a detailed description of implementations of methods, apparatuses and/or articles of manufacture, it should be understood that the legal scope of the property right is defined by the words of the claims set forth at the end of this patent. Accordingly, the following detailed description is to be construed as examples only and does not describe every possible implementation, as describing every possible implementation would be impractical, if not impossible. Numerous alternative implementations could be implemented, using either current technology or technology developed after the filing date of this patent. It is envisioned that such alternative implementations would still fall within the scope of the claims.

Figure 1:
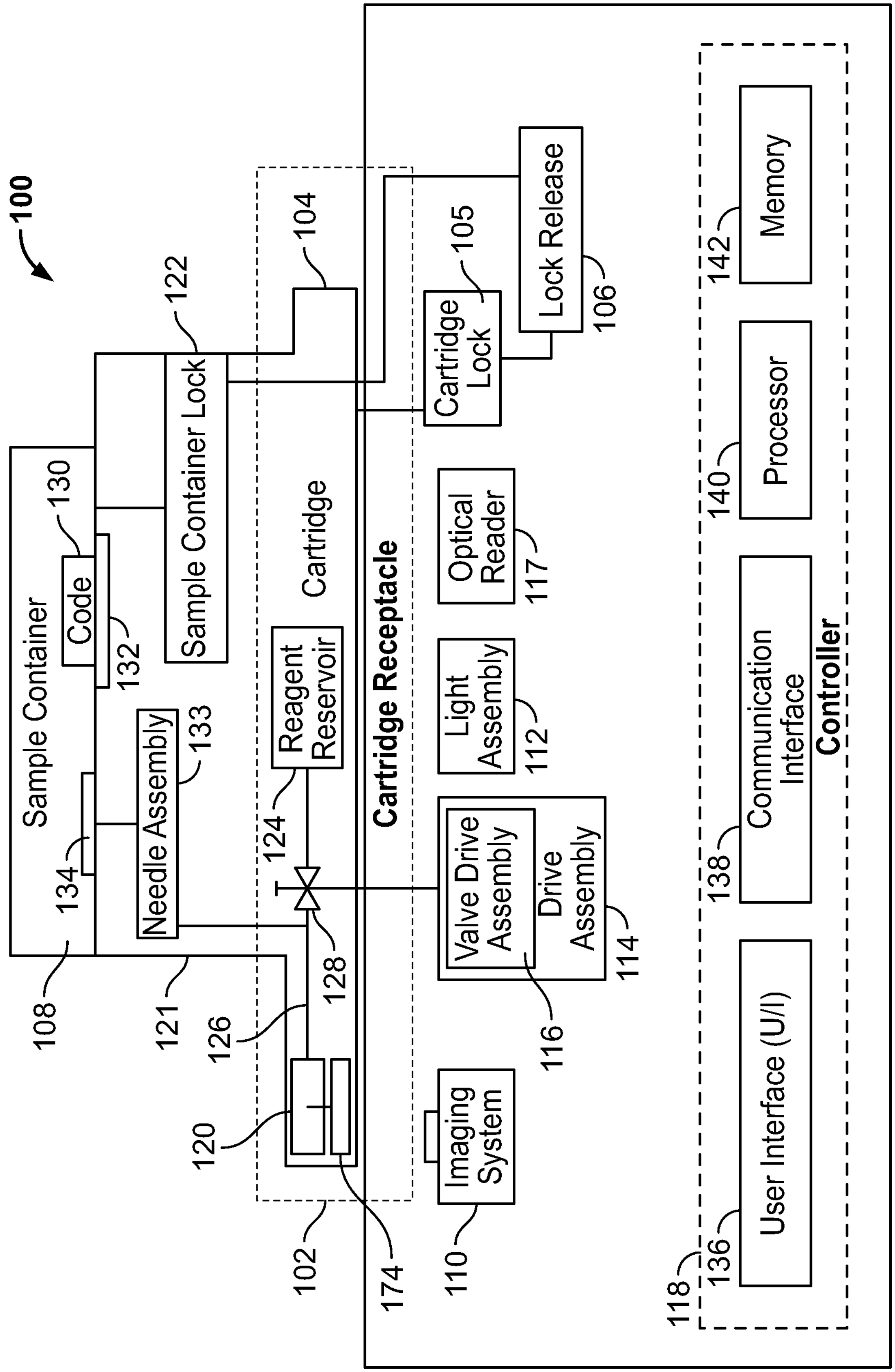
FIG. 1 illustrates a schematic diagram of an implementation of a system in accordance with the teachings of this disclosure.

FIG. 1 illustrates a schematic diagram of an implementation of a system 100 in accordance with the teachings of this disclosure. The system 100 can be used to perform an analysis on one or more samples of interest. In the implementation shown, the system 100 may be a tabletop system for point-of-care diagnostics and includes a cartridge receptacle 102 that receives a cartridge 104, a cartridge lock 105 that secures the cartridge 104 within the cartridge receptacle 102 during a testing procedure, and a lock release 106 that actuates the cartridge lock 105 to allow the cartridge 104 and a sample container 108 to be removed together from the system 100 when a target molecule is not identified in the sample. Allowing both the cartridge 104 and the sample container 108 to be removed together from the system 100 reduces the likelihood that subsequent characterization testing is inadvertently performed on a sample. The system 100 also includes an imaging system 110, a light assembly 112, a drive assembly 114 including a valve drive assembly 116, an optical reader 117, and a controller 118. The controller 118 is electrically and/or communicatively coupled to the cartridge lock 105, the lock release 106, the imaging system 110, the light assembly 112, the drive assembly 114, and the optical reader 117 to perform various functions as disclosed herein.

In the implementation shown, the cartridge 104 can be coupled with the cartridge receptacle 102 using, for example, the cartridge lock 105, and includes a sample well 120 that receives a sample for testing, a sample container receptacle 121 that receives the sample container 108, and a sample container lock 122 that secures the sample container 108 within the sample container receptacle 121. The sample well 120 may be referred to as a sample chamber and may be fluidically coupled to a diagnostic indicator 174. The diagnostic indicator 174 may be a test strip and may be referred to as a visual indicator. Alternatively, the diagnostic indicator 174 may be omitted. The cartridge 104 also includes a reagent reservoir 124 that may contain fluid (e.g., reagent and/or another reaction component), a fluidic line 126, and a valve 128 that may be selectively actuatable to control the flow of fluid between the reagent reservoir 124 and the sample well 120 and/or the diagnostic indicator 174 through the fluidic line 126. The cartridge 104 may also include a passive and/or an active microfluidic element(s) to move fluid within the cartridge 104. For example, the cartridge 104 may include a pump and/or the system 100 may include a pump that the cartridge 104 can be coupled with.

During a testing procedure, the sample container 108 is secured in the sample container receptacle 121 using the sample container lock 122 and the cartridge 104 is coupled to the cartridge receptacle 102 of the system 100 using the cartridge lock 105. The system 100 may also include an alignment feature that aligns the cartridge 104 and/or the sample well 120 relative to the imaging system 110. The alignment feature may be one or more pins that are received within the cartridge 104. However, other alignment features may be usable.

To verify and/or identify information about the patient and/or the test taking place, the optical reader 117 can read a code 130 on the sample container 108 and the system 100 identifies information associated with the code 130. The system 100 may compare the information associated with the code 130 to reference information to verify the patient data and/or the test being performed and/or for product traceability purposes. In some implementations, the cartridge 104 includes a window 132 to allow the optical reader 117 to visually access the code 130 through the window 132. Alternatively, the code 130 on the sample container 108 may be positioned outside of the cartridge 104 to allow the optical reader 117 to read the code 130. The optical reader 117 may be a barcode reader or another type of scanner, the code 130 may be a barcode, and the data may include patient data, test data, the name of the patient, and/or the target molecule being tested for. However, different types of optical readers may be useable, different types of codes such as radio-frequency identification (RFID) tags may be usable, and/or the data may be associated with additional or alternative types of data.

To deposit the sample within the sample container 108 to perform the testing procedure, the cartridge 104 includes a needle assembly 133 that can actuate to pierce a septum 134 of the sample container 108. Once the septum is pierced, the needle assembly 133 can draw a sample from the sample container 108, flow the sample though the fluidic line 126, and deposit the sample within the sample well 120. While the needle assembly 133 is mentioned piercing the septum 134, the cartridge 104 may alternatively include a siphon that can be positioned within the sample container 108 to deposit the sample in the sample well 120 from the sample container 108. In another implementation, the needle assembly 133 and the septum 134 may be omitted. In such implementations, an operator can use a pipet 135 (see, FIG. 4) to draw a sample from the sample container 108 and deposit the sample within the sample well 120.

Regardless of how the sample is transferred to the sample well 120, in some implementations, the sample may flow from the sample well 120 to the diagnostic indicator 174 having a probe molecule(s) or a population of probe molecules coated with deoxyribonucleic acid (DNA) or ribonucleic acid (RNA) oligonucleotides that binds with DNA or RNA within the sample, such that complimentary nucleotide sequences (DNA or RNA fragments) hybridize to one or more oligonucleotide probe(s). In various implementations, the sample may contain DNA or DNA fragments which hybridize to a complementary DNA oligonucleotide probe (e.g., by DNA-DNA hybridization). In various implementations, the sample may contain RNA or RNA fragments which hybridize to a complementary DNA oligonucleotide probe (e.g., by DNA-RNA hybridization). In various implementations, the sample may contain DNA or DNA fragments which hybridize to a complementary RNA oligonucleotide probe (e.g., by DNA-RNA hybridization). In various implementations, the sample may contain RNA or RNA fragments which hybridize to a complementary RNA oligonucleotide probe e.g., by RNA-RNA hybridization). In related implementations, an RNA sample may be reverse transcribed to produce a complementary DNA (cDNA) sample prior to detection with a DNA or RNA oligonucleotide probe using methods such as reverse transcription polymerase chain reaction (RT-PCR).

Reagent can be added to the sample well 120 and flow to the diagnostic indicator 174 to allow an identifiable label (e.g., a fluorescent marker) to be attached to the probe molecule(s) and for the presence of a particular target molecule within the sample to be determined. Additionally, the sample may be heated and/or mixed within, for example, the sample well 120. The target molecule in the sample may be labeled, detected or identified with any technique capable of being used in an assay with arrays or beads, including but not limited to fluorescent, luminescent, phosphorescent, quantum dot, light scattering colloidal particles, radioactive isotopes, mass spectroscopy, NMR (nuclear magnetic resonance), EPR (electro paramagnetic resonance), ESR (electron spin resonance), IR (infrared), FTIR (Fourier transform infra red), Raman spectroscopy, or other magnetic, vibrational, electromagnetic, electrical, pH, RNA-Sequencing (RNA-Seq), CRISPR/Cas systems (e.g. using fluorescently labeled nuclease-deficient Cas9 (dCas9)), chemical or optical labeling or detection techniques In some such implementations, one or more of the identifiable labels have a unique fluorescent label that emits light when excited. The emission of light at a specific wavelength (or absence thereof) is used to detect the presence of the target molecule within the sample. The target molecule in the sample may be a nucleic acid, nucleotide sequence or fragment thereof of viruses (e.g., viral DNA or RNA). Some viruses that can be the target molecule in a sample, include, but are not limited to, Human severe acute respiratory syndrome coronavirus 2 (SARS-CoV-2) [COVID-19], Human severe acute respiratory syndrome SARS coronavirus (SARS-CoV-1) or other coronaviruses, respiratory syncytial virus (RSV), strep throat, adeno-associated virus, zika virus, and/or influenza viruses (e.g., influenza A virus, influenza B virus, and influenza C virus). However, other target molecules are detectable.

In practice, the imaging system 110 excites one or more of the identifiable labels (e.g., a fluorescent label) within the sample well 120 and/or on the diagnostic indicator 174 and thereafter obtains image data for the identifiable labels. The labels may be excited by incident light and/or a laser and the image data may include one or more wavelengths of light emitted by the respective labels in response to the excitation. The image data (e.g., detection data) may be analyzed by the system 100. The imaging system 110 may be a fluorescence spectrophotometer including an objective lens and/or a solid-state imaging device. The solid-state imaging device may include a charge coupled device (CCD) and/or a complementary metal oxide semiconductor (CMOS).

In some implementations, after the test is performed and depending on whether the target molecule is found to be present/absent in the sample tested, the system 100 causes the light assembly 112 to display a first color through the sample container 108 indicative of the target molecule being present within the sample or causes the light assembly 112 to display a second color through the sample container 108 indicative of the target molecule not being present within the sample. The light assembly 112 may display the light indicating the presence/absence of the target molecule through the sample container 108 itself to produce a light pipe effect. In some implementations, the sample container 108 includes a label (see, the label 154 of FIG. 4) having a thermal print medium and the system 100 includes a heater that heats the label, thereby blacking out a portion of the label. For example, the heater may heat a portion of the label forming a check box that indicates a positive result or a negative result or the heater can heat a portion of the label to form a barcode relating to a positive result or a negative result, allowing for subsequent reading of the label to automatically link the patient information to the test result.

If the system 100 determines that the target molecule is present within the sample, in some implementations, the lock release 106 of the system 100 actuates the sample container lock 122 to the unlocked position to allow the sample container 108 to be removed from the sample container receptacle 121. Thus, when the target molecule is present within the sample, the user can place the sample container 108 in a rack for subsequent characterization testing. After the sample container 108 is removed, the lock release 106 of the system 100 can actuate the cartridge lock 105 to the unlocked position to allow the cartridge 104 to be removed from the system 100 and, for example, discarded. In some implementations, when the system 100 determines that the target molecule is present within the sample, the system 100 associates the code 130 with the target molecule identified and orders subsequent verification testing for the sample.

However, if the system 100 determines that the target molecule is not present within the sample, the sample container 108 remains secured within the sample container receptacle 121 and the lock release 106 actuates the cartridge lock 105 to allow the cartridge 104 and the sample container 108 to be removed from the system 100 together and, for example, discarded. By releasing the sample container 108 from the cartridge 104 when the target molecule is identified but not when the target molecule is not identified, sample containers 108 not having the target molecule are not inadvertently saved and/or comingled with sample containers 108 that are to receive subsequent verification testing.

Regardless of the results of the testing procedure performed, after the cartridge 104 and/or the sample container 108 are removed from the system 100, the system 100 may be cleaned before another testing procedure takes place. The system 100 may be cleaned using bleach for Amplicon control. In some implementations, the system 100 is sealed to deter the egress of fluid and cross contamination.

Referring now to the drive assembly 114, in the implementation shown, the drive assembly 114 includes the valve drive assembly 116 that interfaces with the valve 128 to control the flow of fluid from the reagent reservoir 124 to the sample well 120. The valve 128 can be implemented by a rotary valve having a first position that blocks flow to the sample well 120 and a second position that allows flow from the reagent reservoir 124 to the sample well 120. Alternatively, the drive assembly 114, the valve drive assembly 116, the valve 128, and the reagent reservoir 124 can be omitted and any reagent and/or reaction component used during testing can be added to the sample well 120 using, for example, the pipet 135.

Referring to the controller 118, in the implementation shown, the controller 118 includes a user interface 136, a communication interface 138, one or more processors 140, and a memory 142 storing instructions executable by the one or more processors 140 to perform various functions including the disclosed implementations. The user interface 136, the communication interface 138, and the memory 142 are electrically and/or communicatively coupled to the one or more processors 140.

In an implementation, the user interface 136 receives input from a user and provides information to the user associated with the operation of the system 100 and/or an analysis taking place. For example, the user interface 136 can provide a visual display to indicate the presence or an absence of the target molecule within the sample. Some messages that may be displayed using the user interface 136 include, for example, "engage cartridge" which instructs the user to engage the cartridge 104 with the system 100; "engage sample tube" which instructs the user to engage the sample container 108 within the sample chamber receptacle 121; "load sample into cartridge" which instructs the user to deposit the sample within the sample well 120; "recap sample/running test" which instructs the user to couple a cap (see, the cap 180 of FIG. 5) onto the sample container 108 and informs the user that the system 100 is performing a diagnostic test; "negative test result" which informs the user that the target molecule is not present within the sample; "negative test result—discard consumable" which informs the user to discard both the cartridge 104 and the sample container 108; "positive test result" which informs the user that the target molecule is present within the sample; "positive test result—retain sample for reflex testing" which informs the user to save the sample container 108 for subsequent testing; "positive test result—discharge cartridge" which informs the user to discard the cartridge; and "clean me please" which informs the user to clean the system 100 prior to a subsequent testing procedure taking place. However, the user interface 136 can display additional or different prompts and/or information. The user interface 136 may include a touch screen, a display, a key board, a speaker(s), a mouse, a track ball and/or a voice recognition system. The touch screen and/or the display may display a graphical user interface (GUI).

In an implementation, the communication interface 138 is adapted to enable communication between the system 100 and a remote system(s) (e.g., computers) using a network(s). The network(s) may include the Internet, an intranet, a local-area network (LAN), a wide-area network (WAN), a coaxial-cable network, a wireless network, a wired network, a satellite network, a digital subscriber line (DSL) network, a cellular network, a Bluetooth connection, a near field communication (NFC) connection, etc. Some of the communications provided to the remote system may be associated with analysis results, imaging data, etc. generated or otherwise obtained by the system 100. Some of the communications provided to the system 100 may be associated with a diagnostics procedure, an analysis operation, patient records, and/or a protocol(s) to be executed by the system 100.

The one or more processors 140 and/or the system 100 may include one or more of a processor-based system(s) or a microprocessor-based system(s). In some implementations, the one or more processors 140 and/or the system 100 includes one or more of a programmable processor, a programmable controller, a microprocessor, a microcontroller, a graphics processing unit (GPU), a digital signal processor (DSP), a reduced-instruction set computer (RISC), an application specific integrated circuit (ASIC), a field programmable gate array (FPGA), a field programmable logic device (FPLD), a logic circuit and/or another logic-based device executing various functions including the ones described herein.

The memory 142 can include one or more of a semiconductor memory, a magnetically readable memory, an optical memory, a hard disk drive (HDD), an optical storage drive, a solid-state storage device, a solid-state drive (SSD), a flash memory, a read-only memory (ROM), erasable programmable read-only memory (EPROM), electrically erasable programmable read-only memory (EEPROM), a random-access memory (RAM), a non-volatile RAM (NVRAM) memory, a compact disc (CD), a compact disc read-only memory (CD-ROM), a digital versatile disk (DVD), a Blu-ray disk, a redundant array of independent disks (RAID) system, a cache and/or any other storage device or storage disk in which information is stored for any duration (e.g., permanently, temporarily, for extended periods of time, for buffering, for caching).

Figure 2:
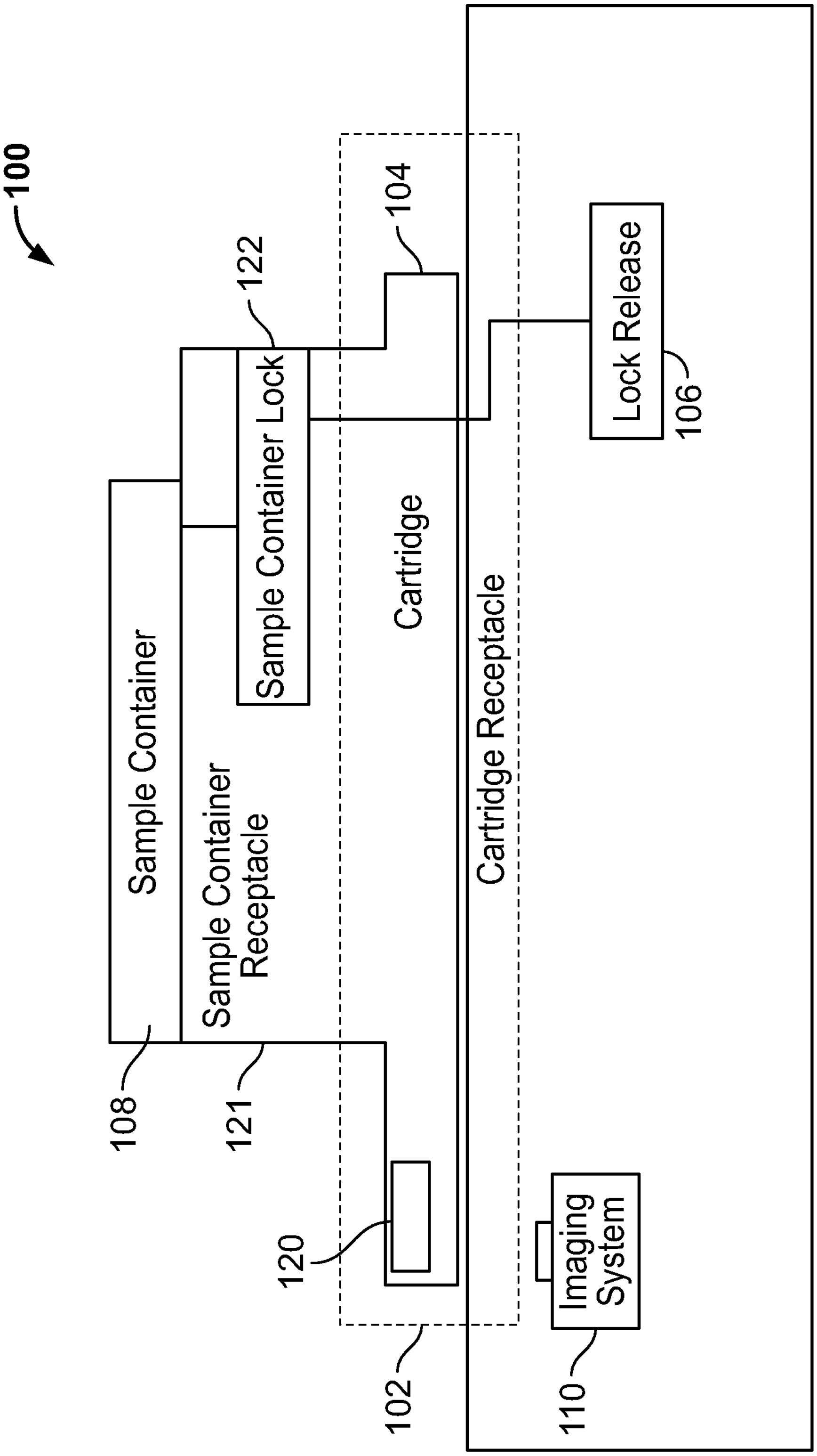
FIG. 2 is another implementation of the system of FIG. 1.

FIG. 2 is another implementation of the system 100 of FIG. 1. In the implementation shown, the system 100 includes the cartridge receptacle 102 and the lock release 106 and the cartridge 104 can be coupled with the cartridge receptacle 102 and includes the sample well 120 that receives a sample for testing, a sample container receptacle 121 that receives the sample container 108, and a sample container lock 122 that is movable, using the lock release 106, from a locked position to an unlocked position. The sample container 108 can be disposed within the sample container receptacle 121 and can be secured therein using the sample container lock 122.

During a testing procedure, a sample can be received within the sample well 120. The system 100 can then perform a testing procedure to determine if the target molecule is present within the sample. In response to the system 100 determining that the target molecule is present within the sample, the lock release 106 actuates the sample container lock 122 from the locked position to the unlocked position to allow the sample container 108 to be removed from the sample container receptacle 121. However, in response to the system 100 determining that the target molecule is not present within the sample, the lock release 106 does not actuate the sample container lock 122 from the locked position to the unlocked position. As a result, the cartridge 104 and the sample container 108 remain coupled and both the cartridge 104 and the sample container 108 can be removed from the system 100 together and disposed.

Figure 3:
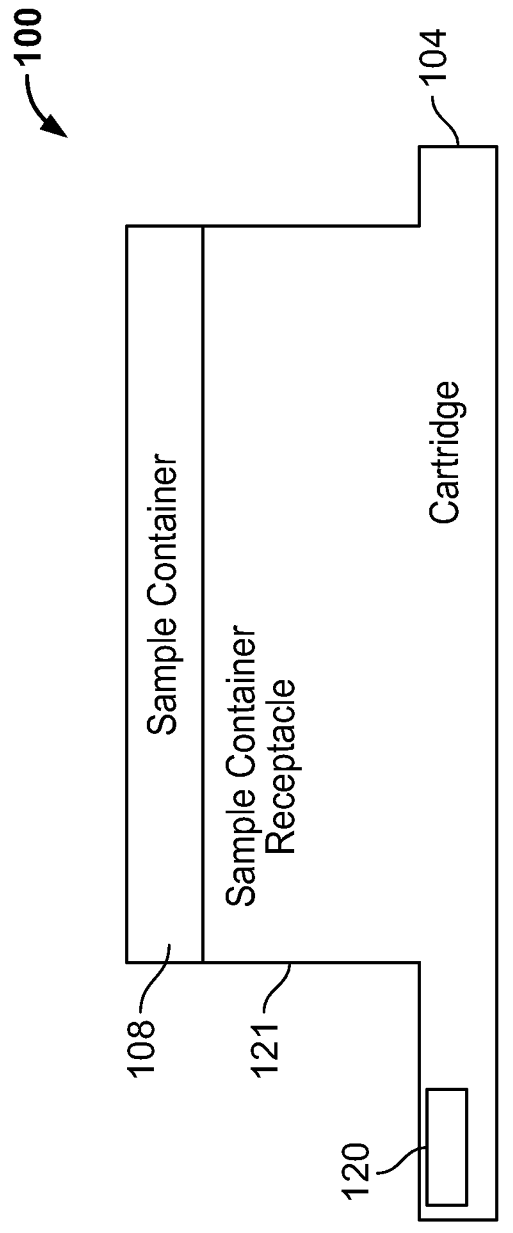
FIG. 3 is another implementation of the cartridge and the sample container that can be used with the system of FIGS. 1 and/or 2.

FIG. 3 is another implementation of the cartridge 104 and the sample container 108 that can be used with the system 100 of FIGS. 1 and/or 2. In the implementation shown, the cartridge 104 includes the sample well 120 that receives a sample for testing and a sample container receptacle 121 that receives the sample container 108. The sample container 108 can be disposed within the sample container receptacle 121 and can contain a sample. During a testing procedure, a portion of the sample from the sample container 108 can be received within the sample chamber 120 to determine a presence of a target molecule within the sample.

Figure 4:
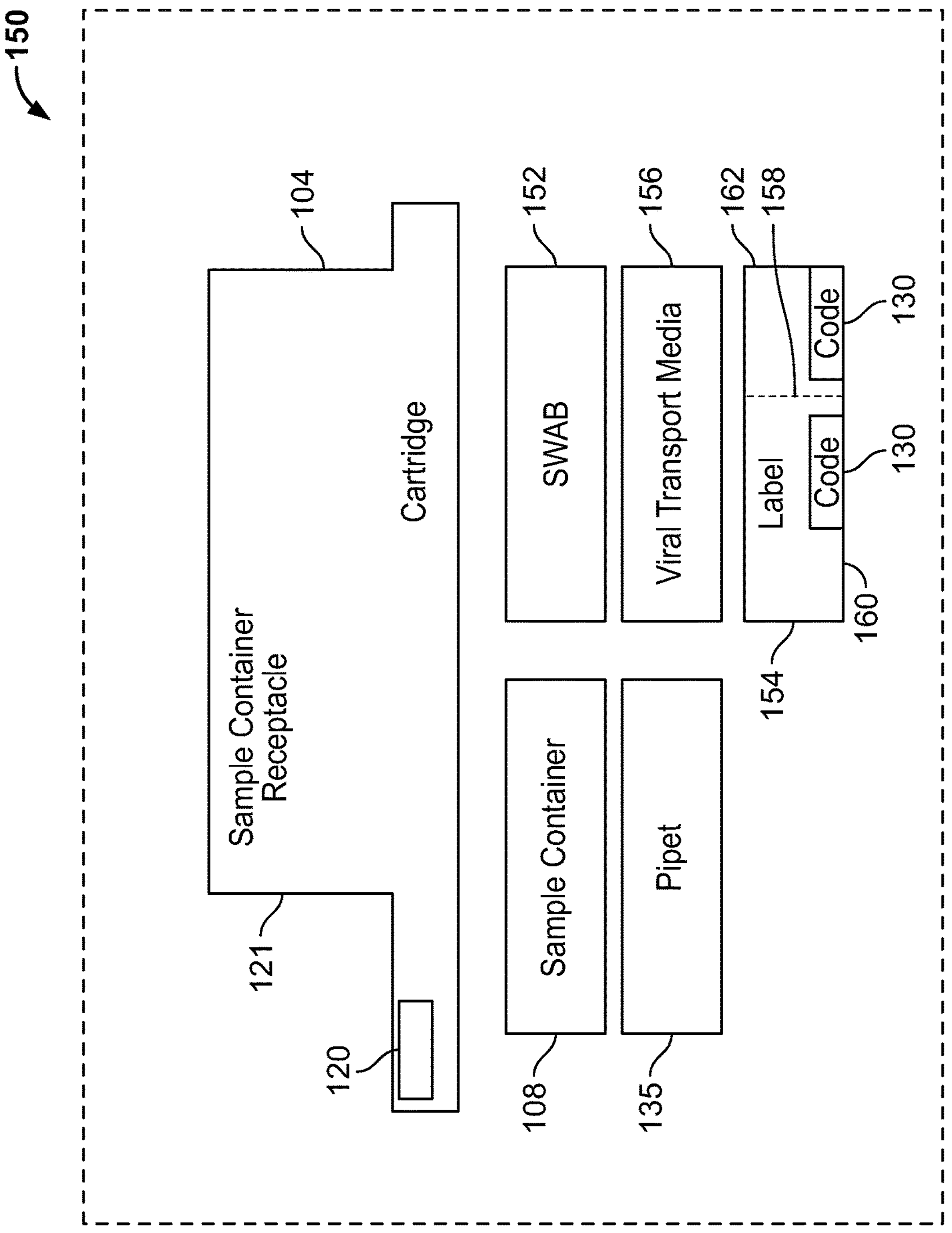
FIG. 4 is an implementation of a testing kit assembly that includes the cartridge and the sample container of FIG. 3 and can be used in association with the system of FIGS. 1 and/or 2.

FIG. 4 is an implementation of a testing kit assembly 150 that includes the cartridge 104 and the sample container 108 of FIG. 3 and can be used in association with the system 100 of FIGS. 1 and/or 2. In the implementation shown, the testing kit assembly 150 includes the cartridge 104, the sample container 108, the pipet 135 used to transfer a sample from the sample container 108 to the sample well 120, and a swab 152 used to perform a sampling procedure. The testing kit assembly 150 also includes a label 154 and viral transport media (VTM) 156 that may be contained in a container such as a bottle, a tube, or a blister pack. In some implementations, the components 104, 156 including liquid are separated from the components 108, 135, 150, 154 not including liquid using, for example, foil. The components 104, 108, 135, 150, 154, 156 can also be packed in one or more pill packs. Other processes of packaging and/or shipping the components 104, 108, 135, 154, 156 may be suitable. In other implementations, one or more of the components shown in the testing kit assembly 150 of FIG. 4 may be excluded from the testing kit assembly 150 and/or sold separately. For example, the swabs 152 and/or the viral transport media 156 may be sold separately and/or in bulk form.

In the implementation shown, the label 154 includes a perforation 158 that separates the label 154 into a first label portion 160 and a second label portion 162, with each label portion 160, 162 having one of the codes 130. In practice, the label 154 may be used to gang the cartridge 104 and the sample container 108 together. Alternatively, the label portions 160, 162 can be separated along the perforation 158 and the first label portion 160 may be adhered to the cartridge 104 and the second label portion 162 can be adhered to the sample container 108 to associate the cartridge 104 and the sample container 108 together. The optical reader 117 of the system 100 can read the codes 130 on both the cartridge 104 and the sample container 108 to verify compatibility between the cartridge 104 and the sample container 108. For example, the system 100 can verify that both the cartridge 104 and the sample contained in the sample container 108 are to be used for COVID-19 testing. Additionally or alternatively, the system 100 can verify that the cartridge 104 and the sample container 108 are associated with the same testing kit assembly 150.

To obtain a sample for testing using the testing kit assembly 150, a healthcare professional uses the swab 152 to obtain a sample from a patient by performing a nasal swab, a nasopharyngeal swab, or a throat swab and the swab 152 with the sample is placed into the sample container 108. The VTM 156 may be added to the sample container 108 prior to or after the swab 152 with the patient sample is added to the sample container 108. Additionally, the label portions 160, 162 may be added to the cartridge 104 and the sample container 108 prior to or after the swab 152 with the patient sample is added to the sample container 108. Thereafter, the sample container 108 may be positioned within the sample container receptacle 121 of the cartridge 104.

Figure 5:
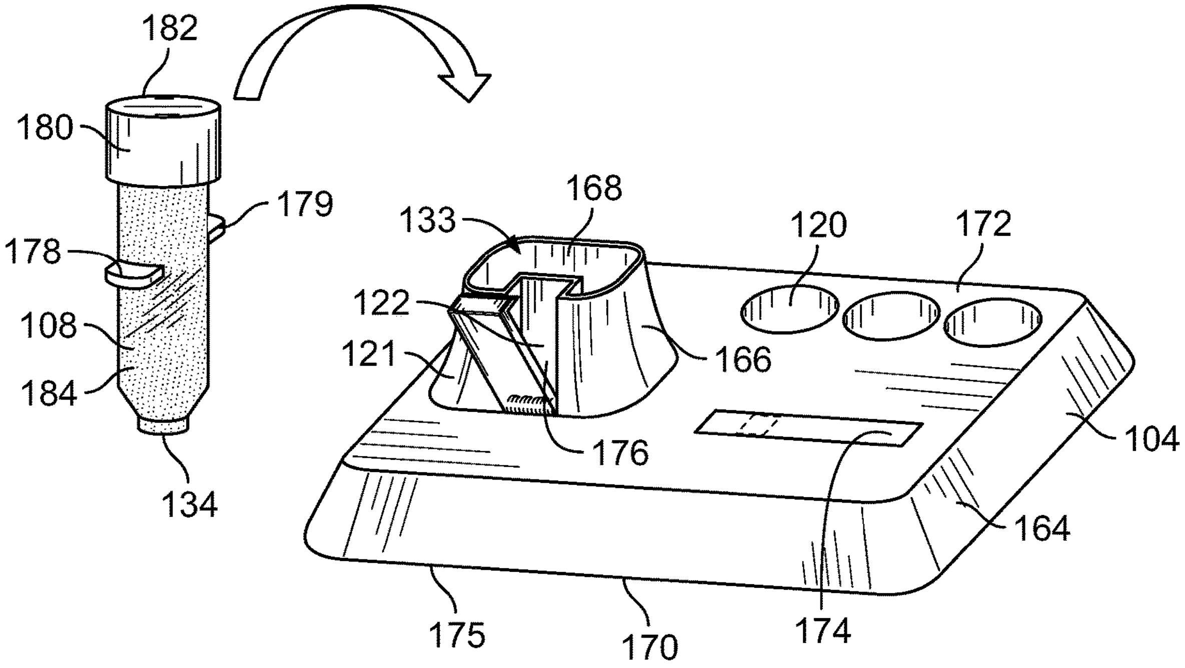
FIG. 5 is another implementation of the cartridge and the sample container that can be used with the systems of FIGS. 1 and/or 2, the cartridge and the sample container of FIG. 3, and/or the testing kit assembly of FIG. 4.

FIG. 5 is another implementation of the cartridge 104 and the sample container 108 that can be used with the systems 100 of FIGS. 1 and/or 2, the cartridge 104 and the sample container 108 of FIG. 3, and/or the testing kit assembly 150 of FIG. 4. In the implementation shown, the cartridge 104 includes a base 164 and a boss 166 extending from the base 164. The boss 166 includes the sample container receptacle 121 that is formed as a hole 168 such as a through hole that allows light piping of the sample container 108.

As shown, the base 164 includes a lower surface 170 that interfaces with the cartridge receptacle 102 of the system 100 and an upper surface 172 from which the boss 166 extends. The upper surface 176 also includes the sample well 120 and the diagnostic indicator 174 such as a diagnostic indicator or a litmus-style display. To secure the cartridge 104 to the cartridge receptacle, 102, the lower surface 170 may include catches 175 that are engageable by a pawl of the cartridge lock 105. In another implementation, the catch 175 may be formed as an aperture that receives a pin of the cartridge lock 105 to couple the cartridge 104 and the system 100 together.

In the implementation shown, the cartridge 104 includes the sample container lock 122 that is formed as a latch 176 and the sample container 108 includes a flange 178 that is engageable by the latch 176 to secure the sample container 108 within the sample container receptacle 121. In other implementations, the sample container 108 includes a groove that receives the latch 176 to secure the sample container 108 within the sample container receptacle 121. Other arrangements may prove suitable. The latch 176 may be spring biased and/or a mechanical pawl and the flange 178 may be an annular flange or a pair of semi-annular flanges 179 as shown.

Referring to the sample well 120, in the implementation shown, the sample container 108 includes a cap 180 at a first end 182 of the sample container 108 and includes the septum 134 at a second end 184 of the sample container 108. The cap 180 is selectively removable to allow a sample and/or the VTM 156 to be deposited within the sample container 108 and the septum 134 is pierced by the needle assembly 133 to allow, for example, the needle assembly 133 to automatically draw a portion of the sample from the sample container 108 and deposit the sample portion in the sample well 120. Alternatively, the sample may be deposited in the sample well 120 by removing the cap 180, drawing a portion of the sample from the sample container 108 using the pipet 135, and depositing the sample portion into the sample well 120.

Figure 6:
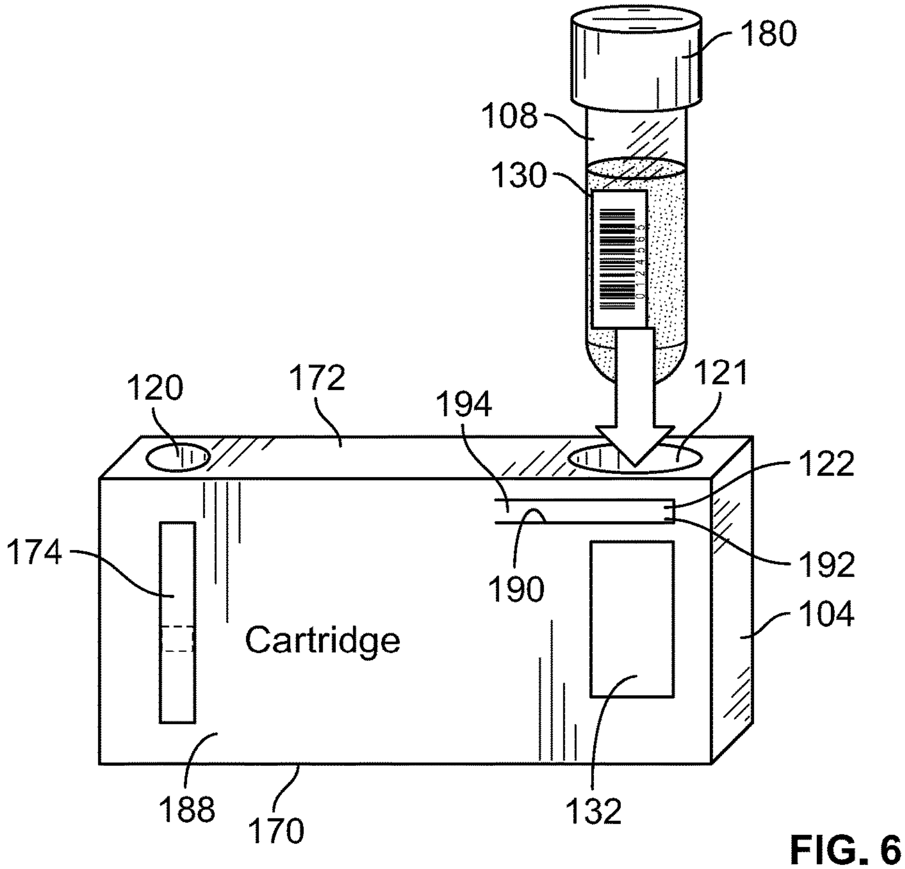
FIG. 6 is another implementation of the cartridge and the sample container that can be used with the systems of FIGS. 1 and/or 2.

FIG. 6 is another implementation of the cartridge 104 and the sample container 108 that can be used with the systems 100 of FIGS. 1 and/or 2. In the implementation shown, the cartridge 104 is formed as a cassette that may be partially and/or fully received within a dimensional envelope of the cartridge receptacle 102 (see, for example, FIGS. 12 and 13). The cartridge 104 includes a side 188 that has the diagnostic indicator 174 and the window 132 that allows the code 130 on the sample container 108 to be viewable when the sample container 108 is received within the sample container receptacle 121. The side 188 of the cartridge 104 also includes the sample container lock 122 that is formed as a cantilever 190 having an end 192 that is biased toward the sample container receptacle 121 and is engageable with the sample container 108 to secure the sample container 108 within the sample container receptacle 121. In some implementations, the end 192 of the cantilever 190 engages with the sample container 108 disposed within the sample container receptacle 121 and forms an interference fit. To release the sample container 108 from within the sample container receptacle 121, the lock release 106 of the system 100 can depress another end 194 of the cantilever 190 to move the distal end 192 of the cantilever 190 away from the sample container 108. In the implementation shown, the cartridge 104 does not include the needle assembly 133 and, thus, the sample may be deposited in the sample well 120 by removing the cap 180, drawing the sample from the sample container 108 using the pipet 135, and depositing the sample portion into the sample well 120.

Figure 7:
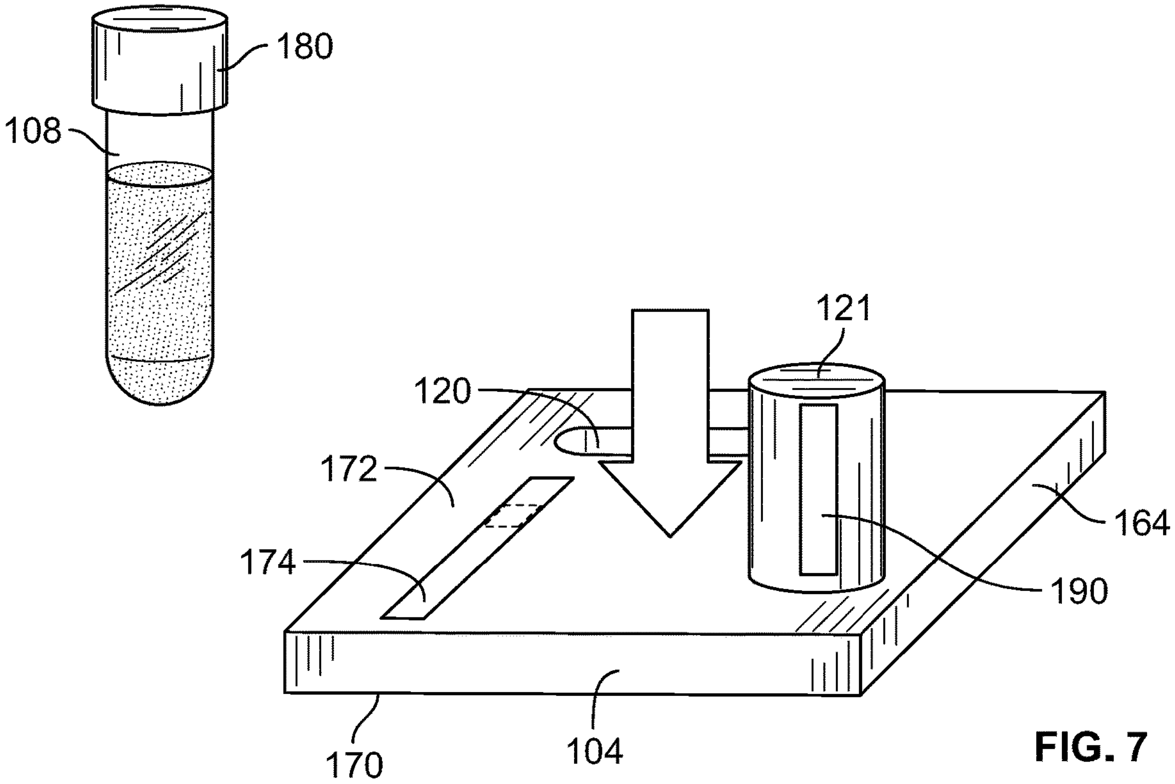
FIG. 7 is another implementation of the cartridge and the sample container that can be used with the systems of FIGS. 1 and/or 2.

FIG. 7 is another implementation of the cartridge 104 and the sample container 108 that can be used with the systems 100 of FIGS. 1 and/or 2. The cartridge 104 of FIG. 7 is similar to the cartridge 104 of FIG. 5. However, in contrast, the cartridge 104 of FIG. 7 does not include the needle assembly 133 and the sample container 108 does not include the septum 134 nor the flange 178. As a result, the sample is transferred into the sample well 120 using the pipet 135 and the sample container 108 is secured within the sample container receptacle 121 based on the interference fit formed between the cantilever 190 and the sample container 108. In some implementations, the sample container 108 includes threads that are threaded into corresponding threads of the cartridge 104.

Figure 8:
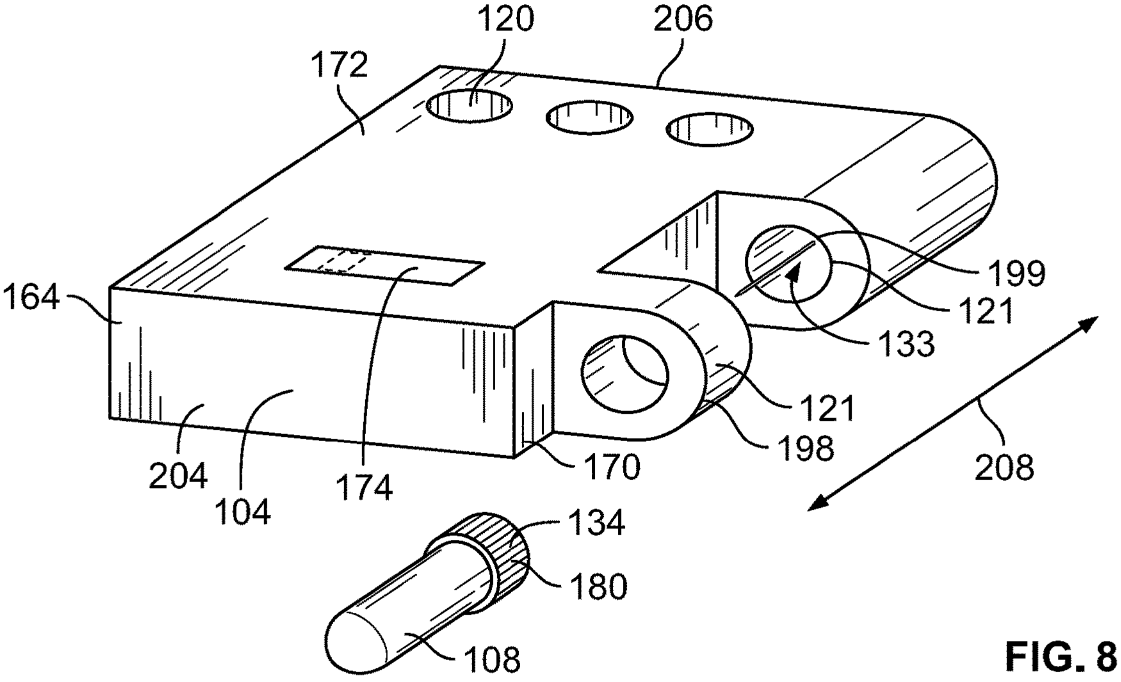
FIG. 8 is another implementation of the cartridge and the sample container that can be used with the systems of FIGS. 1 and/or 2.

FIG. 8 is another implementation of the cartridge 104 and the sample container 108 that can be used with the systems 100 of FIGS. 1 and/or 2. The cartridge 104 of FIG. 8 is similar to the cartridge 104 of FIG. 5. However, in contrast, the cartridge 104 of FIG. 8 includes the sample container receptacle 121 including a collar 198 that receives the sample container 108 and a septum receptacle 199 that receives the cap 180 including the septum 134 of the sample container 108. As such, the needle assembly 133 of the cartridge 104 is positioned to pierce the septum 134, draw a sample from the sample container 108, and deposit the sample within the sample well 120 for testing. The collar 198 may also be referred to as an annulus or a slide-in tube guide.

In the implementation shown, the collar 198 may have internal tapered surfaces that form an interference fit with the sample container 108 and is oriented such that the sample container 108 extends between sides 204, 206 of the cartridge 104 and relative to a transverse axis 208 of the cartridge 104. Put another way, the collar 198 orients the sample container 108 substantially horizontally and/or aligns the sample container 108 and the corresponding septum 134 with the needle assembly 133. As set forth herein, the phrase "substantially horizontally" means equal to horizontal and up to and equal to about 10° of horizontal. However, while the collar 198 is shown in a particular orientation, the collar 198 may be positioned differently as shown in, for example, FIG. 9.

Figure 9:
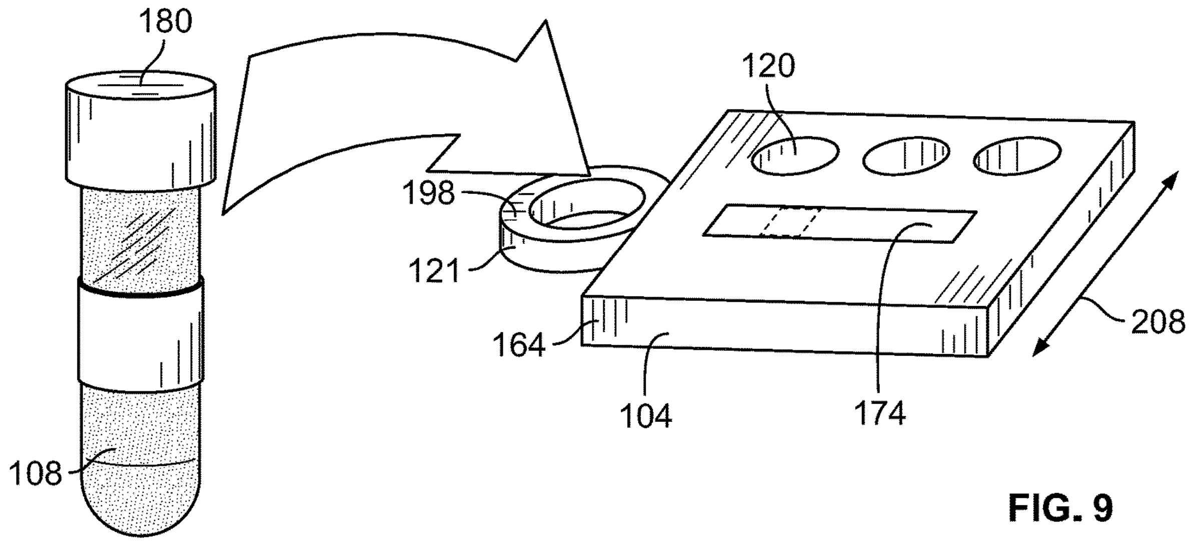
FIG. 9 is another implementation of the cartridge and the sample container that can be used with the systems of FIGS. 1 and/or 2.

FIG. 9 is another implementation of the cartridge 104 and the sample container 108 that can be used with the systems 100 of FIGS. 1 and/or 2. The cartridge 104 of FIG. 9 is similar to the cartridge 104 of FIG. 8. However, in contrast, the cartridge 104 of FIG. 9 does not include the needle assembly 133, the collar 198 is positioned to orient the sample container 108 substantially perpendicularly relative to the axis 208, and the sample container 108 does not include the septum 134. As set forth herein, the phrase "substantially perpendicularly" means up to and equal to about 10° of perpendicular. Because the cartridge 104 of FIG. 9 does not include the needle assembly 133, the sample is transferred into the sample well 120 using the pipet 135.

Figure 10:
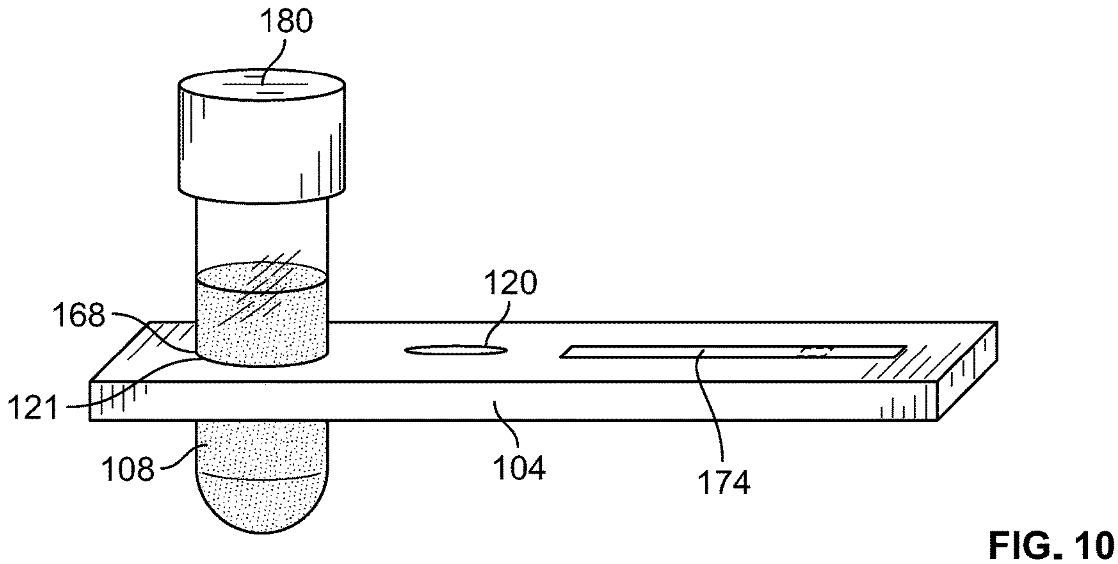
FIG. 10 is another implementation of the cartridge and the sample container that can be used with the systems of FIGS. 1 and/or 2.

FIG. 10 is another implementation of the cartridge 104 and the sample container 108 that can be used with the systems 100 of FIGS. 1 and/or 2. The cartridge 104 of FIG. 10 is similar to the cartridge 104 of FIG. 9. However, in contrast, the cartridge 104 of FIG. 10 does not include the collar 198 but instead includes the hole 168 formed through the cartridge 104 and that receives the sample container 108. The surfaces forming the hole 168 may be inwardly tapered to allow an interference fit to be formed between the cartridge 104 and the sample container 108 or to otherwise allow the sample container 108 to be secured within the sample cartridge receptacle 121.

Figure 11:
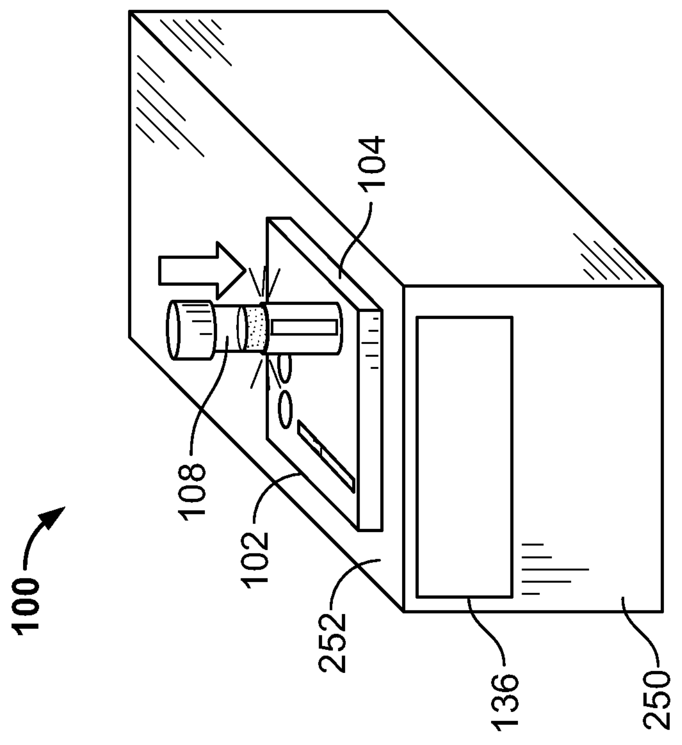
FIG. 11 is an implementation of the system of FIG. 1 coupled with the cartridge and the sample container of FIG. 7.

FIG. 11 is an implementation of the system 100 of FIG. 1 coupled with the cartridge 104 and the sample container 108 of FIG. 7. In the implementation shown, the system 100 includes a body 250 having a top surface 252 that includes the cartridge receptacle 102 to which the cartridge 104 is coupled. Thus, the system 100 is a top-mount system where the cartridge 104 is coupled to and/or at the top surface 252 of the system 100. The system 100 also includes an implementation of the user interface 136 that can display information such as information related to the testing procedure being performed. Providing the system 100 with the top surface 252 including the cartridge receptacle 102 allows the system 100 to be easily cleaned between runs, for example.

Figure 12:
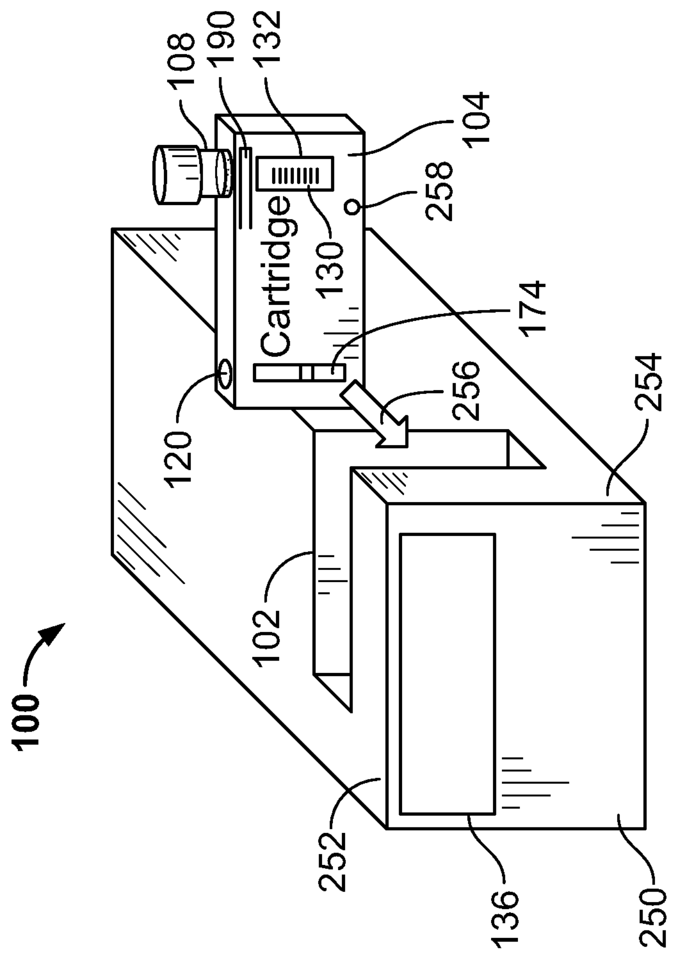
FIG. 12 is another implementation of the system of FIG. 1 and the cartridge and the sample container of FIG. 6.

FIG. 12 is another implementation of the system 100 of FIG. 1 and the cartridge 104 and the sample container 108 of FIG. 6. In the implementation shown, the system 100 includes the body 250 having the top surface 252 and a side surface 254 through which the cartridge receptacle 102 is formed. Thus, the cartridge receptacle 102 of FIG. 12 is formed as a side-accessible slot and the cartridge 104 is receivable within the slot by moving the cartridge 104 into the cartridge receptacle 102 in a direction generally indicated by arrow 256. To retain the cartridge 104 within the cartridge receptacle 102, the cartridge lock 105 may extend and form an interface fit with the cartridge 104. Alternatively, the cartridge 104 can include a hole 258 that receives a pin of the cartridge lock 105 to secure the cartridge 104 within the cartridge receptacle 102. In practice, the cartridge lock 105 can release the cartridge 104 from the cartridge receptacle 121 upon the target molecule not being present within the sample and/or after the sample container 108 is removed from the cartridge 104 for subsequent analysis.

Figure 13:
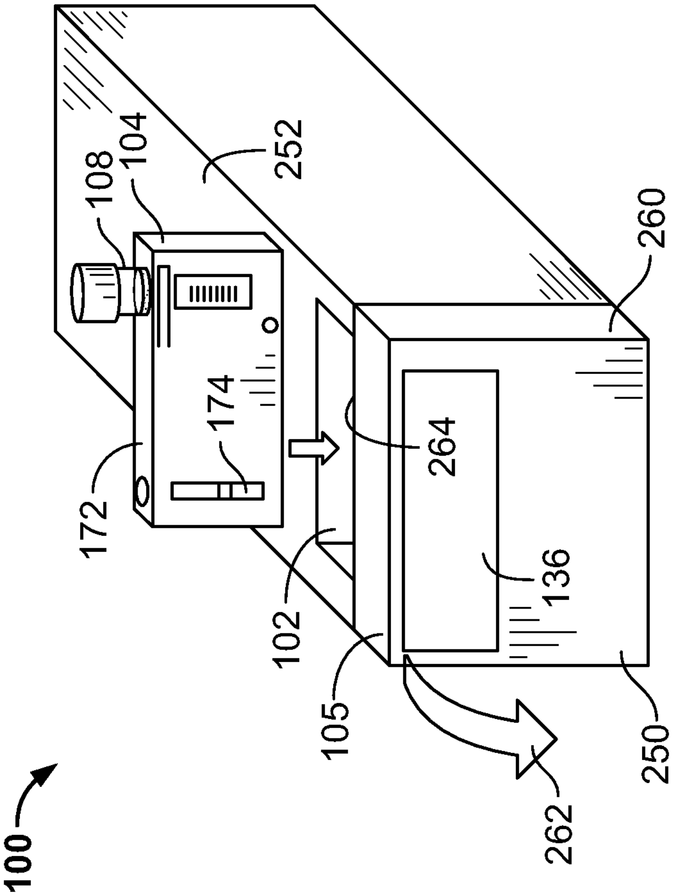
FIG. 13 is another implementation of the system of FIG. 1 and the cartridge and the sample container of FIG. 6.

FIG. 13 is another implementation of the system 100 of FIG. 1 and the cartridge 104 and the sample container 108 of FIG. 6. In the implementation shown, the system 100 includes the body 250 having the cartridge receptacle 102 formed through the top surface 252 and including the cartridge lock 105 that is formed by a hinged front portion 260 of the system 100. In operation, the front portion 260 is movable in a direction generally indicated by arrow 262 to allow access to the sample chamber receptacle 121 such that the cartridge 104 can be positioned within the cartridge receptacle 102. When the front portion 260 is moved back to the position as shown in FIG. 12, a lip 264 of the front portion 260 may be positioned over top of the upper surface 172 of the cartridge 104 to secure the cartridge 104 within the cartridge receptacle 102. In practice, the cartridge lock 105 moves the front portion 260 in the direction generally indicated by the arrow 262 to release the cartridge 104 from the cartridge receptacle 102. Providing the system 100 with the front portion 260 that opens in the direction generally indicated by arrow 262 allows the system 100 to be easily cleaned between runs, for example.

Figure 14:
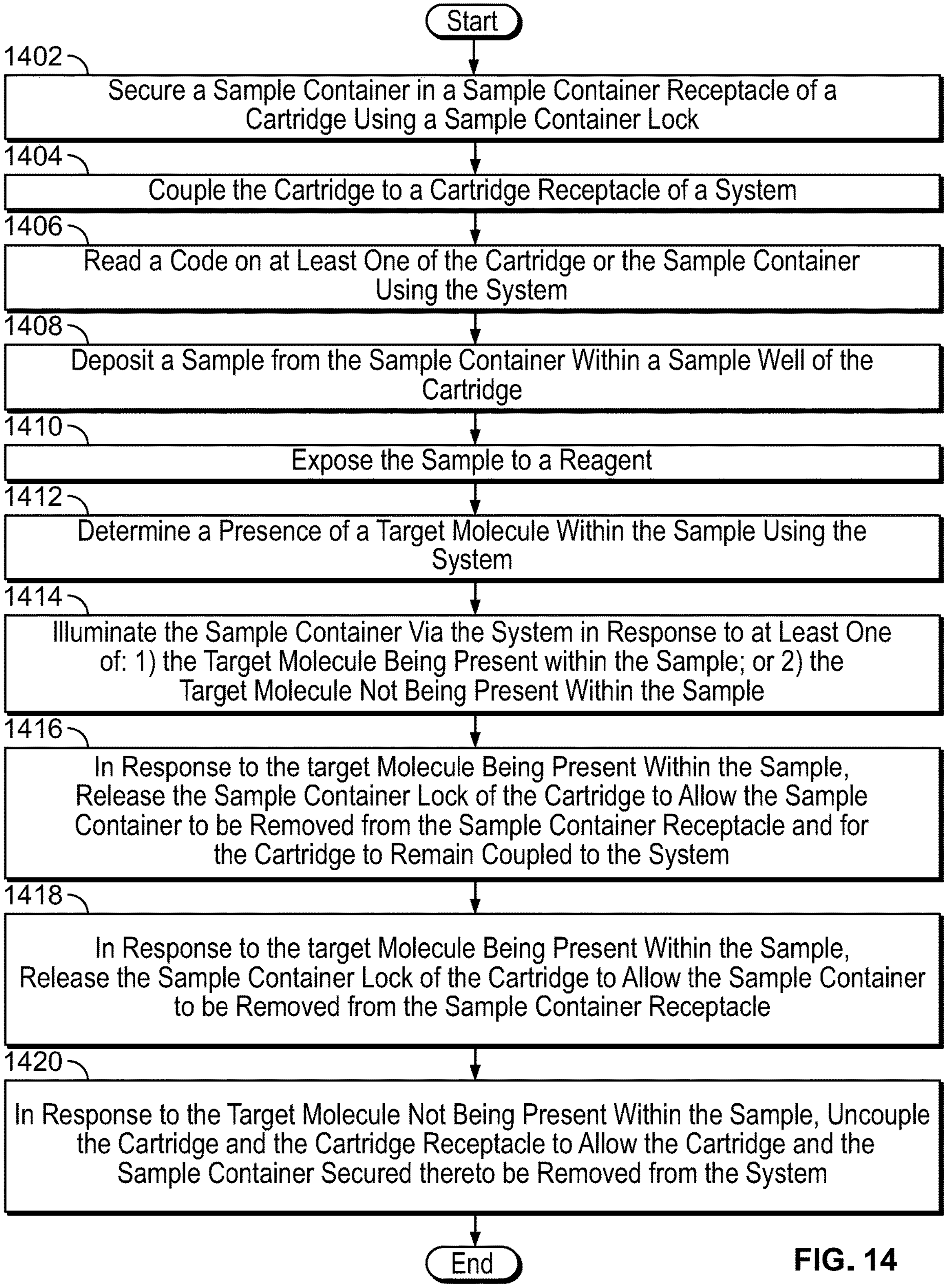
FIG. 14 illustrates a flowchart for an example method of using the systems disclosed herein.
Figure 15:
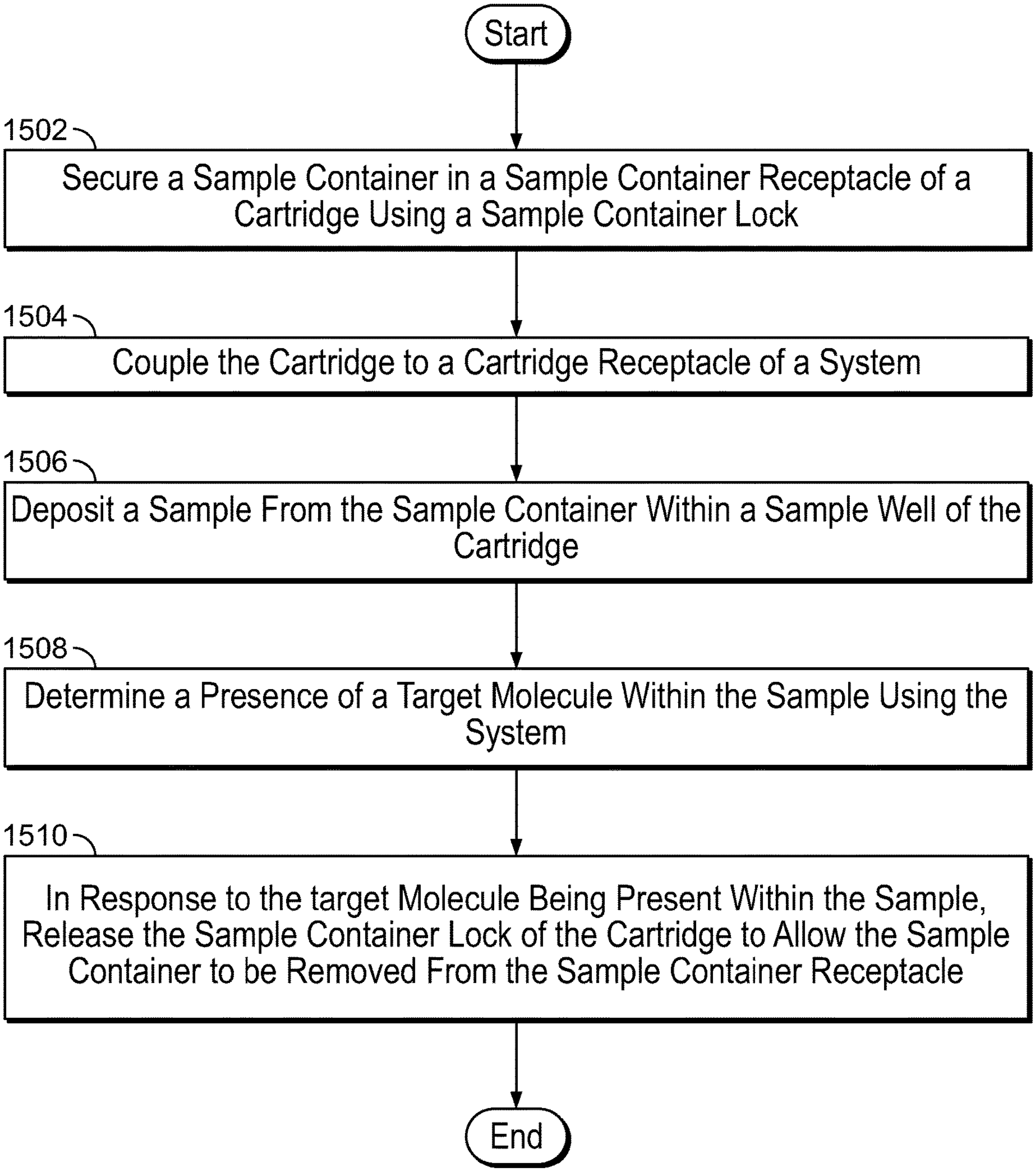
FIG. 15 illustrates another flowchart for an example method of using the systems disclosed herein.

FIGS. 14 and 15 illustrates example flowcharts for methods of using the system 100 disclosed herein. The order of execution of the blocks may be changed, and/or some of the blocks described may be changed, eliminated, combined and/or subdivided into multiple blocks.

The process of FIG. 14 begins with the sample container 108 being secured in the sample container receptacle 121 of the cartridge 104 using the sample container lock 122 (Block 1402). The sample container 108 may contain a sample and can be secured within the sample container receptacle 121 in different ways. For example, securing the sample container 108 may include positioning the spring-biased pawl 176 of the sample container lock 122 over top of the flange 178 on the sample container 108, engaging the sample container 108 with the cantilever 190 to form an interference fit, and/or positioning the sample container 108 through the collar 198 of the cartridge 104. However, other approaches of securing the sample container 108 are suitable.

The cartridge 104 is coupled to the cartridge receptacle 102 of the system 100 (Block 1404). In some implementations, the system 100 includes the cartridge lock 105 that couples the cartridge 104 to the system 100. To couple the cartridge 104 to the cartridge receptacle 102, the cartridge lock 105 may include a mechanical pawl that is received within the catch 175, a groove, or another feature of the cartridge 104 and/or the cartridge lock 105 may include a pin that is received within the hole 2588 of the cartridge 104.

However, the cartridge 104 can be secured to the cartridge receptacle 102 in different ways.

The system 100 reads the code 130 on at least one of the cartridge 104 or the sample container 108 (Block 1408). The system 100 can use the optical reader 117 to read the code 130 on the sample container 108 through the window 132 of the cartridge 104 and can use the information associated with the code 130 for product traceability and/or to determine patient data and/or test data.

The sample is deposited from the sample container 108 to the sample well 120 (Block 1410). The sample can be automatically drawn from the sample container 108 and deposited in the sample well 120 using the needle assembly 133 and/or the sample can be manually drawn from the sample container 108 and deposited in the sample well 120 using the pipet 135.

The sample is exposed to a reagent (Block 1412). In some implementations, the sample is exposed to the reagent by flowing the reagent from the reagent reservoir 124 through the fluidic line 126 toward the sample well 120 and/or onto the diagnostic indicator 174. The reagent may include an identifiable label (e.g., a fluorescent marker) that is used to allow the presence of a particular target molecule within the sample portion to be determined. In some implementations, the cartridge 104 includes a passive and/or active microfluidic element(s) such as a pump that moves the regent from the reagent reservoir 124 to the sample well 120 to allow the sample to be exposed to the reagent. Alternatively, the reagent may be deposited in the sample well 120 using the pipet 135.

The presence of a target molecule within the sample is determined using the system 100 (Block 1414). The target molecule may be associated with COVID-19. However, the target molecule may be associated with respiratory syncytial virus (RSV), strep throat, influenza, and/or another molecule of interest.

In some implementations, the system 100 illuminates the sample container 108 in response to at least one of: 1) the target molecule being present within the sample; or 2) the target molecule not being present within the sample (Block 1416). The sample container 108 can be illuminated using the light assembly 112. The light assembly 112 may display a green light through the sample container 108 when the target molecule is not present in the sample and the light assembly 112 may display a red light through the sample container 108 when the target molecule is present in the sample. However, the light assembly 112 can illuminate the sample container 108 and/or another portion of the cartridge 104 using any color light or not at all.

In response to the target molecule being present within the sample, the sample container lock 122 is released to allow the sample container 108 to be removed from the sample container receptacle 121 and for the cartridge 104 to remain coupled to the system 100 (Block 1418). In some implementations, releasing the sample container lock 122 includes actuating the sample container lock 122 using the lock release 106 of the system 100. The lock release 106 can release the cartridge 104 from being coupled with the system 100 after the sample container 108 is removed. However, in response to the target molecule not being present within the sample, the system 100 uncouples the cartridge 104 and the cartridge receptacle 102 to allow the cartridge 104 and the sample container 108 secured thereto to be removed from the system 100 (Block 1420).

The process of FIG. 15 begins with the sample container 108 being secured in the sample container receptacle 121 of the cartridge 104 using the sample container lock 122 (Block 1502). The sample container 108 may contain a sample and can be secured within the sample container receptacle 121 in different ways. For example, securing the sample container 108 may include positioning the spring-biased pawl 176 of the sample container lock 122 over top of the flange 178 on the sample container 108, engaging the sample container 108 with the cantilever 190 to form an interference fit, and/or positioning the sample container 108 through the collar 198 of the cartridge 104.

The cartridge 104 is coupled to the cartridge receptacle 102 of the system 100 (Block 1504). In some implementations, the system 100 includes the cartridge lock 105 that couples the cartridge 104 to the system 100. To couple the cartridge 104 to the cartridge receptacle 102, the cartridge lock 105 may include a mechanical pawl that is received within a groove or another feature of the cartridge 104 and/or the cartridge lock 105 may include a pin that is received within a hole 208 of the cartridge 104. However, the cartridge 104 can be secured to the cartridge receptacle 102 in different ways.

The sample is deposited from the sample container 108 to the sample well 120 (Block 1506). The sample can be automatically drawn from the sample container 108 and deposited in the sample well 120 using the needle assembly 133 and/or the sample can be manually drawn from the sample container 108 and deposited in the sample well 120.

The presence of a target molecule within the sample is determined using the system 100 (Block 1508). The target molecule may be associated with COVID-19. However, the target molecule may be associated with respiratory syncytial virus (RSV), strep throat, influenza, and/or another molecule of interest. In response to the target molecule being present within the sample, the sample container lock 122 is released to allow the sample container 108 to be removed from the sample container receptacle 121 and for the cartridge 104 to remain coupled to the system 100 (Block 1510).

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or process recited in the singular and proceeded with the word "a" or "an" should be understood as not excluding plural of said elements or processes, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising," "including," or "having" an element or a plurality of elements having a particular property may include additional elements whether or not they have that property. Moreover, the terms "comprising," including, "having," or the like are interchangeably used herein.

The terms "substantially," "approximately," and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

What is claimed is:

1. A method, comprising:

securing a sample container in a sample container receptacle of a cartridge using a sample container lock;

coupling the cartridge to a cartridge receptacle of a system;

depositing a sample from the sample container within a sample well of the cartridge;

determining a presence of a target molecule within the sample using the system;

illuminating the sample container using the system in response to at least one of: 1) the target molecule being present within the sample; or 2) the target molecule not being present within the sample; and in response to the target molecule being present within the sample, releasing the sample container lock of the cartridge to allow the sample container to be removed from the sample container receptacle.

2. The method of claim 1, wherein the target molecule is associated with severe acute respiratory syndrome coronavirus 2.

3. The method of claim 1, wherein releasing the sample container lock of the cartridge includes actuating the sample container lock.

4. The method of claim 1, wherein, in response to the target molecule not being present within the sample, uncoupling the cartridge and the cartridge receptacle to allow the cartridge and the sample container secured thereto to be removed from the system.

5. The method of claim 1, wherein the sample container lock comprises a spring-biased pawl and the sample container comprises a flange and wherein securing the sample container in the sample container receptacle comprises positioning the spring-biased pawl over top of the flange.

6. The method of claim 1, further comprising reading, using the system, a code on at least one of the cartridge or the sample container.

7. The method of claim 1, wherein securing the sample container in the sample container receptacle includes positioning the sample container through a collar of the cartridge.

8. The method of claim 1, further comprising exposing the sample to a reagent, wherein exposing the sample to the reagent comprises flowing a reagent from a reagent reservoir of the cartridge through a fluidic line of the cartridge toward the sample well.

* * * * *